United States Patent [19]

Schulze

[11] Patent Number: 4,593,580
[45] Date of Patent: Jun. 10, 1986

[54] DEVICE FOR SHIFTING WITHOUT CLUTCH AND WITHOUT SYNCHRONIZING ELEMENTS IN A MULTIPLE GEAR RATIO TRANSMISSION OF A VEHICLE

[75] Inventor: Bernd-Guido Schulze, Wolfsburg, Fed. Rep. of Germany

[73] Assignee: Volkswagenwerk Aktiengesellschaft, Wolfsburg, Fed. Rep. of Germany

[21] Appl. No.: 745,374

[22] Filed: Jun. 17, 1985

Related U.S. Application Data

[63] Continuation of Ser. No. 326,662, Dec. 3, 1981, abandoned.

[30] Foreign Application Priority Data

Dec. 5, 1980 [DE] Fed. Rep. of Germany ....... 3045840

[51] Int. Cl.[4] ............................................. B60K 41/08
[52] U.S. Cl. ....................................... 74/858; 74/859; 74/860; 74/862
[58] Field of Search ................. 74/857, 858, 859, 860, 74/866, 872

[56] References Cited

U.S. PATENT DOCUMENTS 3,335,830  8/1967  De Coye De Castelet ...... 74/858 X
3,349,878 10/1967  De Coye De Castelet ...... 74/858 X
3,354,744 11/1967  Kuhnle et al. .................... 74/866 X
3,645,366  2/1972  Numazawa et al. .............. 74/872 X
3,763,720 10/1973  Aono et al. ....................... 74/857
4,200,007  4/1980  Espenschied et al. ............ 74/872 X
4,223,573  9/1980  Franssen ............................ 74/858
4,266,447  5/1981  Heess et al. ....................... 74/858
4,355,550 10/1982  Will et al. ......................... 74/858 X
4,370,903  2/1983  Stroh et al. ....................... 74/866 X
4,403,527  9/1983  Mohl et al. ....................... 74/866 X

FOREIGN PATENT DOCUMENTS 2742033  3/1979  Fed. Rep. of Germany .

Primary Examiner—Kenneth J. Dorner
Assistant Examiner—Joseph M. Rolnicki
Attorney, Agent, or Firm—Brumbaugh, Graves, Donohue & Raymond

[57] ABSTRACT

In a vehicle drive with a drive engine, power control means coupled to the engine, and a multiple gear ratio transmission without a clutch or synchronizing elements, a regulating means is coupled to the power control means for unloading the engine at the beginning of the gear change and for adjusting the speed of the engine after the old gear is disengaged to a speed corresponding to a vehicle speed with the new gear engaged.

3 Claims, 2 Drawing Figures

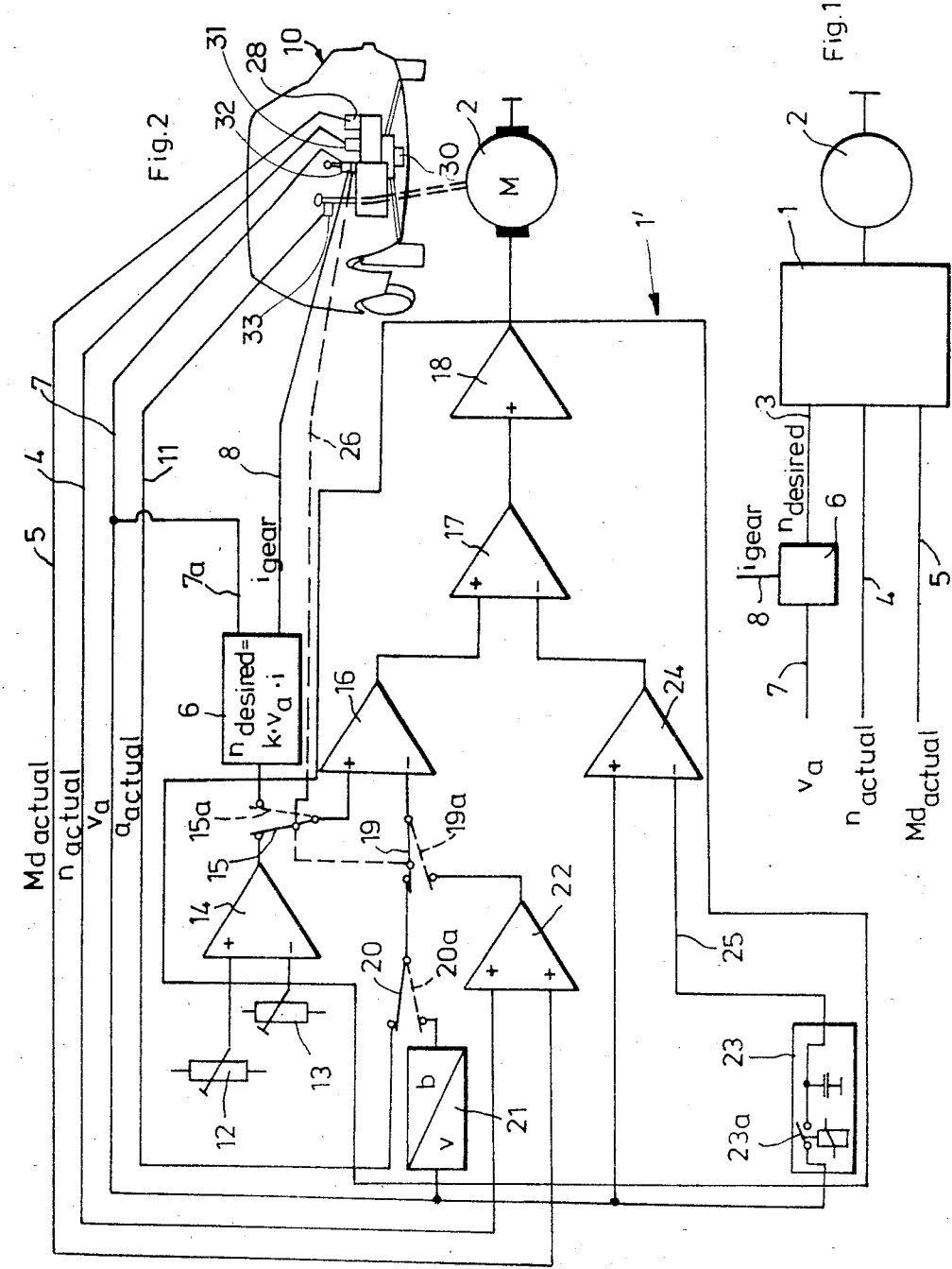

DEVICE FOR SHIFTING WITHOUT CLUTCH AND WITHOUT SYNCHRONIZING ELEMENTS IN A MULTIPLE GEAR RATIO TRANSMISSION OF A VEHICLE

This application is a continuation of application Ser. No. 326,662, filed Dec. 3, 1981, now abandoned.

BACKGROUND OF THE INVENTION

This invention relates to a device for shifting without a clutch and without synchronizing elements in a multiple gear ratio transmission of a vehicle drive.

From German Letters of Disclosure 27 42 033 there is known a device for obtaining synchronous operation of a multiple gear ratio transmission whereby, on the shifting of the transmission from one gear into another, a control unit designated as a "regulator" changes the engine rotational speed from a speed corresponding to one gear to a speed corresponding to the other gear following a predefined speed gradient. On reaching the synchronous speed of the engine associated with the new gear, the shifting of the transmission is carried out, possibly with a lead allowance. The change of the engine rotational speed according to the predefined fixed speed gradient implies, however, that a true matching of the engine rotational speed to the synchronous speed corresponding to the new gear is not attained. It follows that, unless shifting is executed precisely on attainment of the synchronous speed, an overshooting of the engine speed occurs so that a new control process must follow. The disclosed device can be best utilized in an arrangement in which the gearshifting is executed automatically, i.e., the attainment of the synchronous speed can be utilized as a signal for the carrying-out of the gear-shifting process. However, if the operator actuates the gearshift manually, considerable difficulties are encoutered since the operator, on appearance of a signal indicating the synchronous state, would have to shift immediately. This is not always possible, particularly in case of rough or tight shifts. The known arrangement, furthermore, deals only with the setting of the synchronous speed, and thus assumes a state in which the old gear has already been disengaged. However, nothing is indicated as to how this might be possible and atained without actuation of a clutch.

SUMMARY OF THE INVENTION

It is a purpose of the present invention to create a device for shifting without a clutch and without synchronizing elements in a multiple gear ratio transmission of a vehicle drive by which the aforeindicated difficulties are avoided and smooth and comfortable shifting becomes possible.

In accord with the present invention, a vehicle drive is provided with a driving engine, a power control element coupled to the engine for adjusting the speed of the engine during gear changing, and a multiple gear ratio transmission without a clutch or synchronizing elements. A regulator is coupled to the power control element for unloading the engine at the beginning of a gear change and for adjusting the engine after the old gear is disengaged to a speed corresponding to a vehicle spped with the new gear engaged.

Due to the fact that, according to the invention, at the start of the shifting process, i.e., at the time when the operator touches the shift lever, the engine by means of a corresponding actuation of the power control element is rendered torque-free, a noiseless disengagement of the old gear is facilitated. There then occurs a regulation of the engine rotational speed to a synchronous speed associated with the new gear, wherein a desired value-actual value comparison between the actually measured engine speed and the desired speed determined by means of the vehicle speed and the transmission ration associated with the selected but not yet engaged new gear is undertaken. This implies that overshooting of the engine speed beyond the synchronous speed is not possible so that a device of this kind is suitable also for transmissions which are actuated manually.

BRIEF DESCRIPTION OF THE DRAWINGS

FIG. 1 is a schematic diagram illustrating the principles of a device in accordance with the invention; and FIG. 2 is a partly diagrammatic illustration of one embodiment of a shifting device in accord with the invention.

DETAILED DESCRIPTION

In FIG. 1, 1 designates a regulating device which actuates a control motor 2 for adjusting a power control element of an engine for driving a vehicle, e.g., a throttle valve of a spark-ignition engine. To the regulating device 1 are delivered by the signal lines 3 to 5 the desired and actual values needed for regulation of the engine speed. For example, the signal line 3 delivers the desired speed $n_{desired}$ which is formed in a desired-value generator 6 from the actual value of the vehicle speed $V_a$ detected by a sensor 30 and delivered by the signal line 7 and the value of the transmission mission ratio i of the engaged or selected gear delivered by the signal line 8. The signal lines 4 and 5, on the other hand, deliver the actual values of the engine speed $n_{actual}$ as well as of the engine torque $Md_{actual}$ obtained by engine speed and engine torque measuring elements 28 and 29, rspectively.

The regulating device 1 is designed in such a manner that on commencement of the shifting process, i.e., when the operator contacts the shift lever of the variable-speed transmission as detected by a sensor 32, the power control element is first adjusted through the control motor 2 in a manner whereby the actual driving torque of the engine $Md_{actual}$ becomes zero, so that neither a positive (tractive) or negative (braking) torque of the engine is present. In this condition, since the desired speed still coincides with the actual speed of the engine, the engaged gear of the multiple gear ratio transmission can be disengaged smoothly and noiselessly.

After the old gear has been disengaged and the new gear is preselected by the corresponding actuation of the shift lever as detected by a sensor 31, the regulating device 1 adjusts, by the corresponding actuation of the power control element of the engine via the control motor 2, the engine speed to the desired speed (the synchronous speed) associated with the newly selected gear. After this speed is attained, the shifting process can be terminated by engagement of the new gear. The regulating device 1 can be designed in a manner such that the control motor 2 is actuated as a function of the results of a desired value-actual value comparison which has been undertaken in such a way that the torque-free state of the engine and, respectively, the synchronous speed of the engine are attained very quickly.

FIG. 2 represents a gear shifting example for a system for automatic regultion of the travelling speed of a vehicle into which the device in accordance with the invention has been integrated. 1' designates the regulating device as a whole and 2 the control motor acted on thereby for adjustment of the engine throttle valve of a vehicle 10. 4 and 5 indicate signal lines which carry the actual values of the engine rotational speed and the engine torque coming from the measuring instruments (28 and 29). 7 indicates the actual value of the travelling speed $v_a$ and 11 is a signal line carrying the actual value of the throttle valve position $a_{actual}$ supplied by measuring instruments 30 and 33, respectively measuring the pertinent actual values. 12 and 13 represent potentiometers arranged on the accelerator pedal and brake pedal, respectively, of the vehicle 10, which, during operation of the vehicle, indicate the operator's intentions as manifested by the actuation of the pedals, and, depending on the type of operation, can be considered desired throttle plate or acceleration values. These desired values are forwarded to the two inputs of an operational amplifier 14, where the desired value of the accelerator pedal position-dependent potentiometer 12 is conducted to the positive input and the desired value of the brake pedal position-dependent potentiometer 13 to the negative input. The output of the operational amplifier 14 is forwarded by a switch 15 to the positive input of an operational amplifier 16. The amplifier 16 receives the actual value of the throttle flap position from the measuring instrument 33 or the actual value of the vehicle acceleration on the negative input and produces a desired value-actual value comparison. The deviation determined in the operational amplifier 16 by comparison of the desired value and actual value is sent by a further operational amplifier 17 (discussed more fully hereinbelow) to a power amplifier 18 which acts directly on the control motor 2 adjust the throttle value.

As already suggested above, the vehicle 10 can be operated in different modes. Depending on the position of the switch 20 there is delivered to the operational amplifier 16 which carries out the desired value-actual value cmparison either the actual value of the throttle valve position $a_{actual}$ or the actual value of the vehicle acceleration $b_{actual}$. The actual value of the vehicle acceleration is obtained from the actual value of the vehicle speed $v_a$ by means of a differential element 21 and is supplied to the operational amplifier 16 when the switch 20 assumes position 20a. The switch 20 can be operated manually and determines by its position whether the intentions of the operator, as expressed by the actuation of the accelerator pedal or the brake pedal, are to be considered as the desired value of the throttle valve position or of the vehicle acceleration (or deceleration). In order to safely adjust the power of the engine in the operating mode concerned by means of regulation of the acceleration or deceleration of the vehicle so as to maintain a constant speed, too, there is supplied the actual value of the vehicle speed $v_a$ by an automatic storage 23 (a "sample-and-hold" amplifier). The storage 23 stores the most recent actual value of the vehicle speed and conducts it to the negative input of an operational almplifier 24 when neither acceleration nor deceleration is to take place. The positive input of the amplifier 24 receives the actual value of the vehicle speed $v_a$. The output of the operational amplifier 24 is sent to the input of the operational amplifier 17 following the operational amplifier 16. Accordingly, when the accelerator and brake pedals are not actuated, the invention utilizes the last actual value of the vehicle speed as the desired value, and the throttle valve is actuated as a function of the deviations from the desired value of the vehicle speed. The switch 23a provided in the automatic storage 23 is open as long as neither the accelerator pedal nor the brake pedal is actuated, so the storage 23 stores the most recent value of the vehicle speed. However, if the switch 23a is closed, the value of the vehicle speed $v_a$ is delivered, e.g., by a tachogenerator, to the amplifier 24. A desired value-actual value comparison is thus carried out in the operational amplifier 24 and shows a deviation from regulation only if, in spite of the release of the accelerator and brake pedals, there exists a tendency to modify the stored vehicle speed. It is only such a modification which would then lead by the operational amplifier 17 and the power amplifier 18 to an adjustment of the control motor 2 for the throttle valve of the vehicle 10.

Heretofore, only the normal automotive operation has been described whereby no shifting of the multiple gear ratio transmission was effected. During a change of gears, a touching of the shift lever causes the two switches 15 and 19 to change to the positions 15a and 19a, indicated by the broken lines. The change in position is triggered, e.g., by a signal line 26 branching off a contact switch fixed on the manual shift lever. In the indicated position of the switches 15 and 19, the operational amplifier 16 carrying out the desired value-actual value comparison receives at its positive input the desired engine speed $n_{desired}$. The desired-value generator 6 delivers, from the vehicle speed $v_a$ obtained by a branch line 7a of the signal line 7 and the information on the engaged or selected gear ratio i delivered via the signal line 8, the synchronous speed $n_{syn}$ associated with the gear concerned. At the negative input of the operational amplifier 16, however, is supplied a signal, delivered by an operational amplifier 22, which is composed of the sum of the actual value of the engine torque $Md_{actual}$ and engine speed $n_{actual}$.

At the initial moment of shifting, when the gear shift lever has not yet moved out of the position corresponding to the old gear, the desired engine speed $n_{desired}$ is still equal to the actual engine speed $n_{actual}$ due to the meshing of the drive gears. A deviation from regulation is present at the ouput of the amplifier 16 only when the driving torque of the engine $Md_{actual}$ is not zero. The regulator 1' thus adjusts at the start of the shifting process first a freedom from torque of the engine on attainment of which the old gear can be disengaged noiselessly and comfortably.

Following disengagement of the old gear, i.e., when the driving connection between the driving engine and the vehicle wheels is interrupted, engine torque can no longer be transmitted, so the engine torque $Md_{actual}$ in the course of shifting is always zero. From then on, the regulator carries out a comparison of only the desired values and actual values of the engine speeds. There is thereby delivered by the desired value transmitter 6 as a desired value of the engine speed the synchronous speed associated with the selected but not yet engaged gear. The desired value is composed of the vehicle speed $v_{actual}$, the selected gear i and a constant factor k. When the engine attains the desired speed, the selected gear can again be engaged noiselessly and comfortably, i.e., very softly, without the need to actuate a clutch between the engine and the transmission, as required in conventional vehicles. Since such a clutch is no longer required for gear shifting, a vehicle equipped with the device in accordance with the invention can dispense with such a clutch provided there is present for the starting process a special clutch no longer actuated directly by the vehicle operator, e.g., a centrifugal clutch. Furthermore, it may also be provided that gear shifting is no longer carried out manually but, e.g., can be program-controlled by control motors. The control motors can be actuated electromagnetically and hydraulically or pneumatically.

However, if in a vehicle equipped with the device in accordance with the invention, a clutch is provided that can be actuated by a pedal, even though not required for gear shifting, it would be necessary that the clutch not be actuated while the shift lever be touched for the switches 15 and 19 to move into the shift positions 15a and 19a, as indicated by broken lines, since, during shifting, the clutch would remain engaged.

The regulating device indicated by 1 and 1', respectively, in the drawing operates as a regulator for the command variable of the engine speed n until the new gear is engaged and the gearshift lever is again released. The switches 15 and 19 then revert to the automotive operation position indicated by the full lines.

I claim:

1. A drive for a vehicle comprising:
   a driving engine;
   power control means coupled to said engine for adjusting the speed of said engine during a gear change;
   a multiple gear ratio transmission for coupling said engine to the wheels of said vehicle;
   engine speed detecting means for generating signals corresponding to said speed of said engine;
   engine torque detecting means for generating signals corresponding to the torque of said engine;
   vehicle speed detecting means for generating signals corresponding to the speed of said vehicle;
   gear shift operation detecting means for generating signals corresponding to the old and new gears involved in said gear change; and
   regulating means, coupled to said power control means and responsive to said engine speed signals, said engine torque signals, said vehicle speed signals, and said gear shift operation signals, for adjusting said power control means of said engine to a torque-free condition prior to disengagement of the old gear, and for adjusting said power means for substantially continuously adjusting and controlling said speed of said engine starting substantially at the time of said disengagement of said old gear, and ending substantially at the time the new gear is engaged, from a speed corresponding to said vehicle speed in the old gear, to a synchronous speed corresponding to said vehicle speed in the new gear according to the shift operation being performed.

2. The drive of claim 1 and further comprising:
   a control motor for adjusting said power control means;
   means responsive to said vehicle speed signals and said gear shift operation signals for generating desired value signals for said engine speed;
   means responsive to said engine speed signals and said engine torque signals for generating sum signals corresponding to the sum of said engine torque and said engine speed; and
   comparison means, included in said regulating means, responsive to said sum of said engine torque and said engine speed signals and said desired engine speed signals, for actuating said control motor to adjust said synchronous engine speed.

3. The drive of claim 2 and further comprising:
   a gearshift lever associated with said transmission and actuating said gear shift operation detection means;
   switch means at the inputs to said comparison means and responsive to a supplied control signal for switching said switch means into a position supplying said desired value signals and said sum signals to said comparison means; and
   means in said gearshift operation detection means for supplying said control signal when the vehicle operator touches said gearshift lever.

* * * * *